United States Patent
Perrin et al.

(10) Patent No.: US 9,403,453 B2
(45) Date of Patent: Aug. 2, 2016

(54) BACKREST STOPPER MECHANISM FOR AN EASY ENTRY SEAT ASSEMBLY

(71) Applicant: LEAR CORPORATION, Southfield, MI (US)

(72) Inventors: Philippe Perrin, Rosenheim (DE); Johan E. Gustavsson, Oberding (DE)

(73) Assignee: Lear Corporation, Southfield, MI (US)

( * ) Notice: Subject to any disclaimer, the term of this patent is extended or adjusted under 35 U.S.C. 154(b) by 50 days.

(21) Appl. No.: 14/468,895

(22) Filed: Aug. 26, 2014

(65) Prior Publication Data
US 2015/0061339 A1    Mar. 5, 2015

Related U.S. Application Data

(60) Provisional application No. 61/870,519, filed on Aug. 27, 2013.

(51) Int. Cl.
| | |
|---|---|
| *B60N 2/02* | (2006.01) |
| *B60N 2/44* | (2006.01) |
| *B60N 2/005* | (2006.01) |
| *B60N 2/20* | (2006.01) |
| *B60N 2/30* | (2006.01) |

(52) U.S. Cl.
CPC *B60N 2/44* (2013.01); *B60N 2/005* (2013.01); *B60N 2/20* (2013.01); *B60N 2/206* (2013.01); *B60N 2/3065* (2013.01)

(58) Field of Classification Search
CPC ............. B60N 2/44; B60N 2/20; B60N 2/206
USPC .......................... 297/337, 341, 378.1, 378.12
See application file for complete search history.

(56) References Cited

U.S. PATENT DOCUMENTS

| | | | |
|---|---|---|---|
| 6,139,105 A | 10/2000 | Morgos et al. | |
| 6,540,232 B2 * | 4/2003 | Hansel | B60N 2/206 277/367 |
| 6,805,410 B2 * | 10/2004 | Christoffel | B60N 2/206 297/378.12 |
| 7,021,716 B2 | 4/2006 | Persad et al. | |
| 7,152,923 B2 * | 12/2006 | Charras | B60N 2/206 297/341 |
| 7,172,253 B2 | 2/2007 | Haverkamp | |
| 8,002,355 B2 * | 8/2011 | Kumazaki | B60N 2/20 297/378.12 |
| 8,141,954 B2 * | 3/2012 | Kumazaki | B60N 2/3065 297/341 |
| 8,430,455 B2 * | 4/2013 | Douceau | B60N 2/20 297/378.12 |
| 8,662,589 B2 * | 3/2014 | Suzuki | B60N 2/12 297/378.12 |
| 8,985,691 B2 * | 3/2015 | Tsuruta | B60N 2/2356 297/331 |
| 2003/0127898 A1 * | 7/2003 | Niimi | B60N 2/206 397/367 R |
| 2009/0096270 A1 * | 4/2009 | Halbig | B60N 2/206 297/378.12 |
| 2012/0062012 A1 | 3/2012 | Miller et al. | |
| 2012/0217781 A1 | 8/2012 | Nock et al. | |

* cited by examiner

*Primary Examiner* — Laurie K Cranmer
(74) *Attorney, Agent, or Firm* — Dykema Gossett PLLC

(57) ABSTRACT

An easy entry seat assembly may include a seat frame having a seat bottom and a backrest supported for pivotal movement relative to the seat bottom. A reclining mechanism may be provided on the seat frame to selectively control pivotal movement of the backrest relative to the seat bottom. A backrest stopper mechanism may be provided on the seat frame. The backrest stopper mechanism may include an easy entry stopper that can be movable from a non-actuated position to an actuated position to stop pivotal movement of the backrest in an easy entry position. An easy entry actuator may be provided on the seat frame, wherein operation of the easy entry actuator can cause movement of the easy entry stopper to the actuated position and release the reclining mechanism.

20 Claims, 5 Drawing Sheets

BACKREST STOPPER MECHANISM FOR AN EASY ENTRY SEAT ASSEMBLY

CROSS-REFERENCE TO RELATED APPLICATIONS

This application claims the benefit of U.S. Provisional Application Ser. No. 61/870,519, filed Aug. 27, 2013, the disclosure of which is incorporated herein by reference in its entirety.

TECHNICAL FIELD

The present disclosure relates generally to easy entry seat assemblies, including an easy entry seat assembly having a backrest stopper mechanism that is configured to facilitate entry to a rear row of seats within a vehicle.

BACKGROUND

Easy entry seat assemblies can be used in automobiles and other types of vehicles to help provide entry to a rear row of seats within the vehicle. For example, a typical easy entry seat assembly may include a backrest that is pivotally supported relative to a seat bottom. A reclining mechanism may be provided between the backrest and the seat bottom to facilitate selective movement of the backrest between various positions. In an easy entry seat assembly, the reclining mechanism may also be configured to facilitate movement of the backrest from an upright seated position to a forward easy entry position. However, such reclining mechanisms can be somewhat difficult to operate and may include a relatively large number of parts, thereby increasing the complexity and cost of the easy entry seat assembly.

Thus, although current easy entry seat assemblies and their reclining mechanisms may function in a suitable manner, it can be desirable to provide an improved easy entry seat assembly having a backrest stopper mechanism that is relatively simple to assemble and operate.

SUMMARY

An easy entry seat assembly may include a seat frame having a seat bottom and a backrest supported for pivotal movement relative to the seat bottom. A reclining mechanism may be provided on the seat frame to selectively control pivotal movement of the backrest relative to the seat bottom. A backrest stopper mechanism may be provided on the seat frame. The backrest stopper mechanism may include an easy entry stopper that can be movable from a non-actuated position to an actuated position to stop pivotal movement of the backrest in an easy entry position. An easy entry actuator may be provided on the seat frame, wherein operation of the easy entry actuator can cause movement of the easy entry stopper to the actuated position and release the reclining mechanism.

Various aspects of the present disclosure will become apparent to those skilled in the art from the following detailed description of the various embodiments, when read in light of the accompanying drawings.

BRIEF DESCRIPTION OF THE DRAWINGS

Embodiments of the present disclosure will now be described, by way of example, with reference to the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments, it will be understood that they are not intended to limit the invention to these embodiments. On the contrary, the present disclosure is intended to cover alternatives, modifications and equivalents, which may be included within the spirit and scope of the invention as defined by the appended claims.

Figure 1:
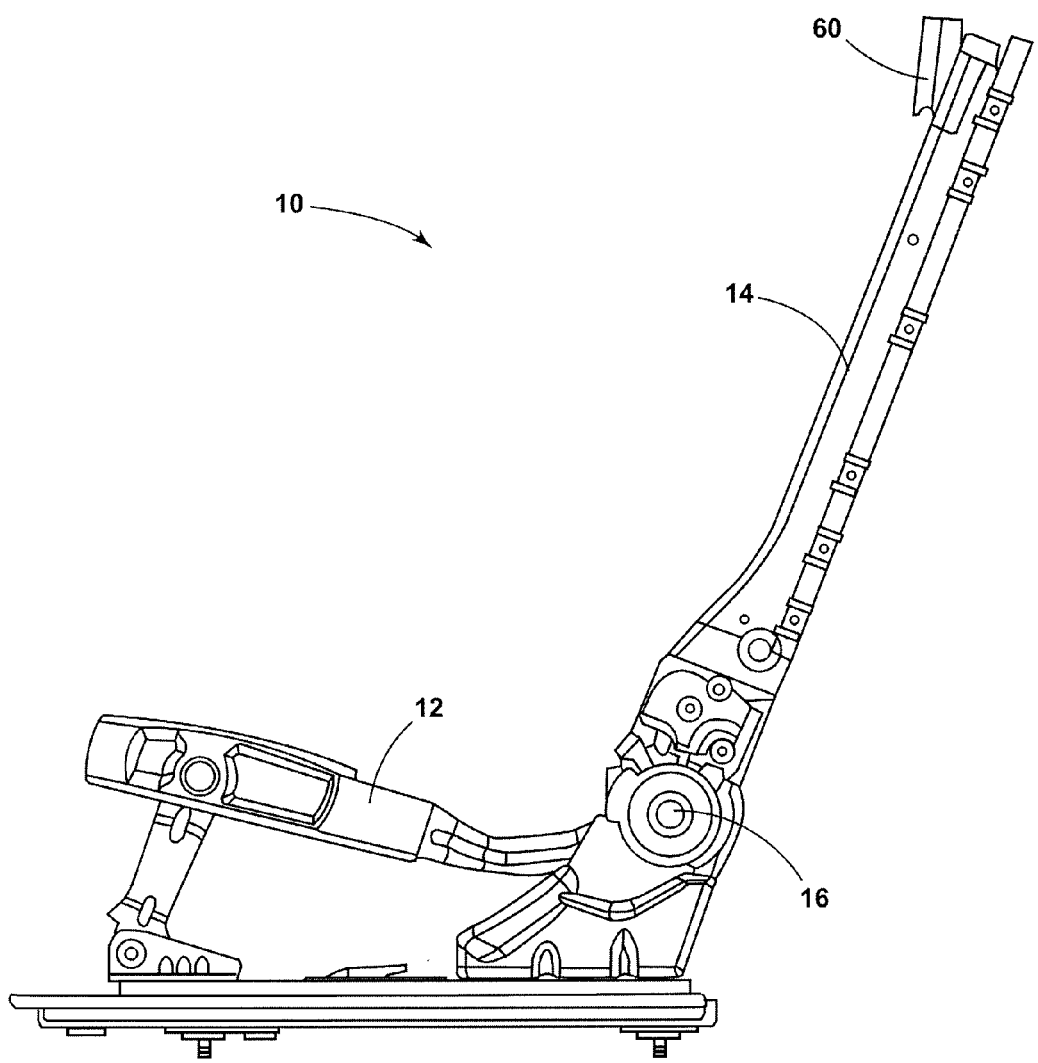
FIG. 1 is a side view of an easy entry seat assembly in accordance with an embodiment of the present disclosure.
Figure 2:
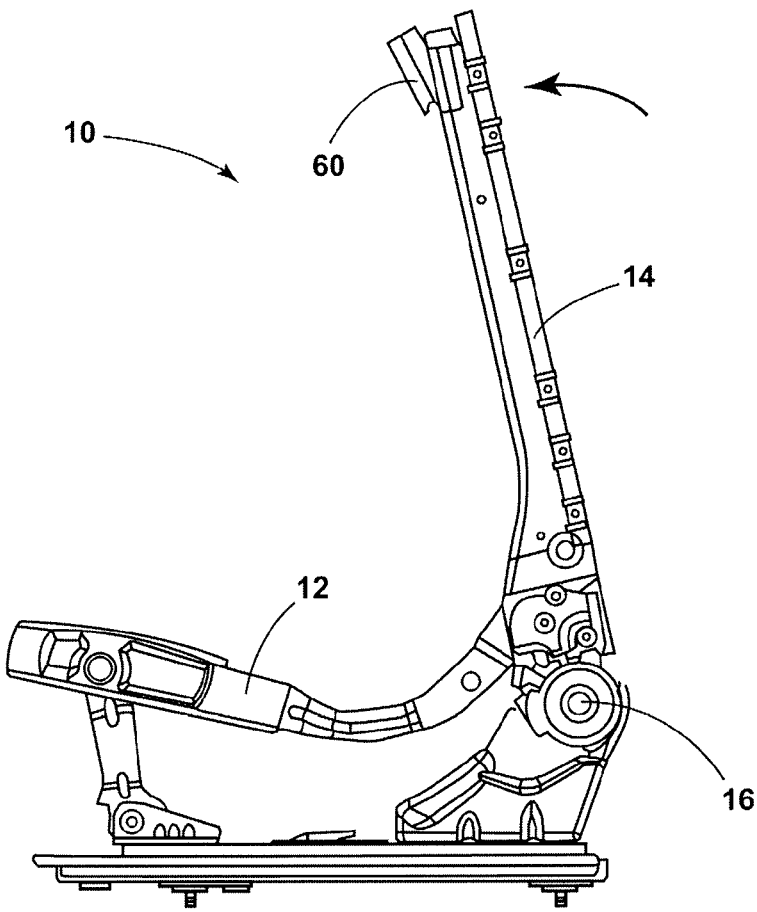
FIG. 2 is a side view of the easy entry seat assembly of FIG. 1, generally shown in an intermediate or easy entry position.
Figure 3:
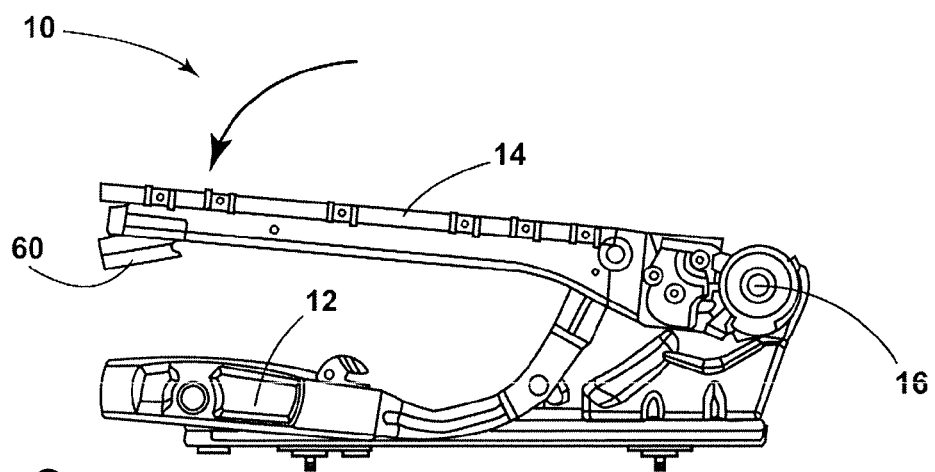
FIG. 3 is a side view of the easy entry seat assembly of FIG. 1, generally shown in a fold flat position.

Referring now to FIGS. 1 through 3, an easy entry seat assembly according to an embodiment of the present disclosure is generally illustrated at 10. For example and without limitation, the easy entry seat assembly 10 may be used to facilitate entry to a rear row of seats in an automobile and other type of vehicle having multiple rows of seats. It should be appreciated, however, that the present disclosure of an easy entry seat assembly is not limited for use in vehicles, but can be used in any suitable environment and for any suitable purpose without departing from the scope of the present disclosure.

As generally illustrated, an easy entry seat assembly 10 may include a seat frame having a seat bottom 12 and a backrest 14, and the backrest 14 may be supported for pivotal movement relative to the seat bottom 12. A reclining mechanism 16 may be provided, for example, on a seat frame between the backrest 14 and the seat bottom 12, to selectively control pivotal movement of the backrest 14. For example and without limitation, the reclining mechanism 16 can comprise a suitable mechanism that is selectively operable to release the backrest 14 for pivotal movement relative to the seat bottom 12 and can subsequently lock the backrest 14 in a desired position.

As generally described below, the backrest 14 may be movable between an upright seated position (e.g., as generally shown in FIG. 1), a forward easy entry position (e.g., as generally shown in FIG. 2), or a fold flat position (e.g., as generally shown in FIG. 3). In addition to these positions, it should be understood that the backrest 14 can be selectively adjusted to various intermediate and/or other positions.

Figure 4:
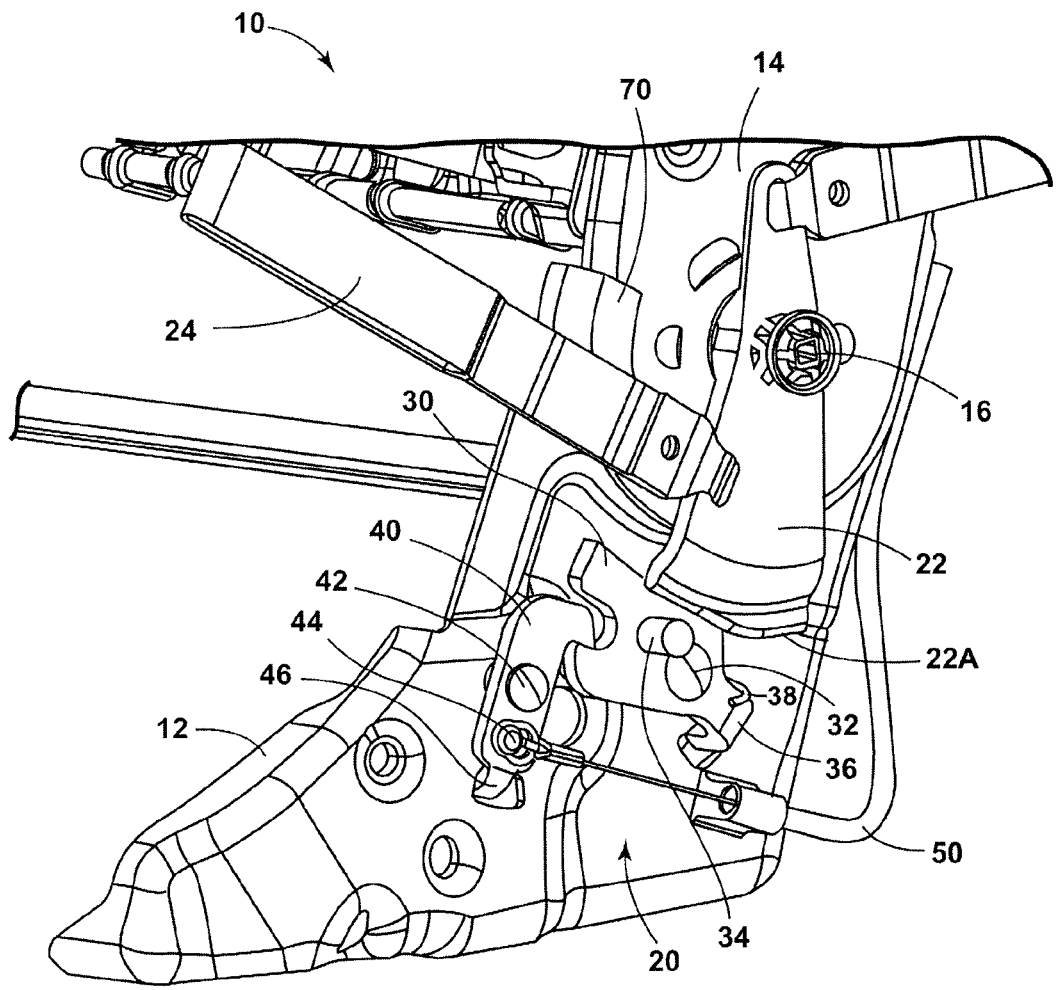
FIG. 4 is a perspective view of a backrest stopper mechanism in accordance with an embodiment of the present disclosure, for use with an easy entry seat assembly such as shown in FIG. 1.

Referring now to FIG. 4, the easy entry seat assembly 10 may include a backrest stopper mechanism, such as generally illustrated at 20. Among other things, the backrest stopper mechanism 20 may be configured to release the reclining mechanism 16 and automatically stop the backrest 14 in the easy entry position (e.g., as generally shown in FIG. 2). An operation of the backrest stopper mechanism 20 will be generally described below in additional detail.

In a non-limiting embodiment, the backrest stopper mechanism 20 may include a recliner lever 22. The recliner lever 22 may, among other things, be generally configured to operate the reclining mechanism 16. For example and without limitation, the recliner lever 22 can be supported on an actuating shaft of the reclining mechanism 16 for pivotal movement to selectively operate the reclining mechanism 16. The recliner lever 22 may optionally include a handle or pull strap 24 to facilitate pivotal movement of the recliner lever 22, although such is not required. In embodiments, the recliner lever 22 may also include a ramped cam surface 22A that extends along an outer edge thereof. At least one potential purpose of a ramped cam surface 22A is generally described below. It should be appreciated that the recliner lever 22 is not limited to the illustrated embodiment, but may have various other suitable shapes and/or configurations for a desired application.

Figure 5:
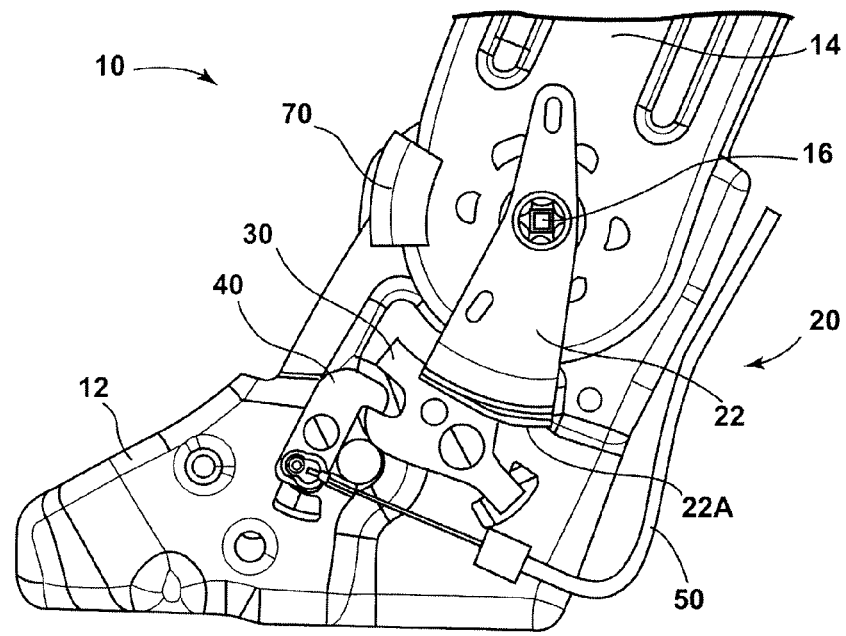
FIG. 5 is a side view of the backrest stopper mechanism of FIG. 4, generally shown in a non-actuated position.
Figure 6:
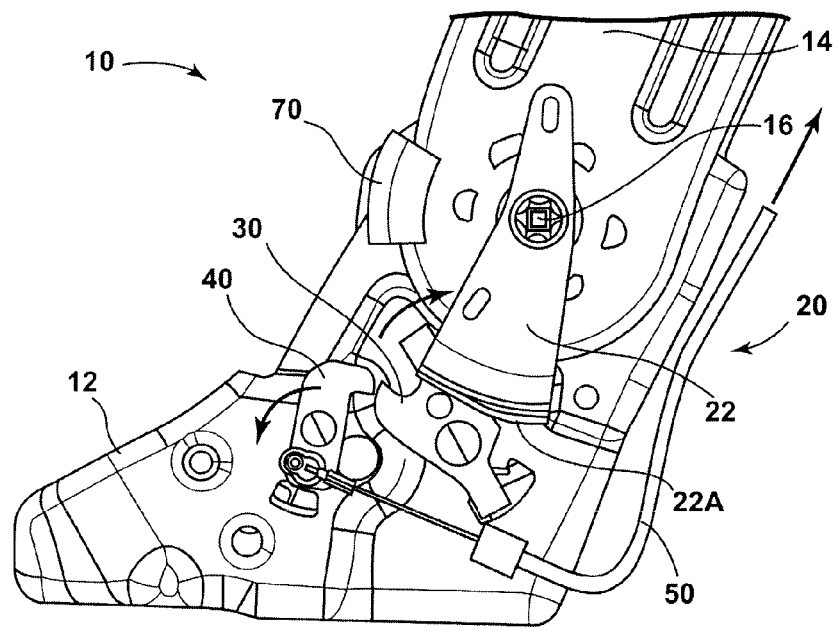
FIG. 6 is a side view of the backrest stopper mechanism of FIG. 4, generally shown in transition from the non-actuated position to an actuated position.
Figure 7:
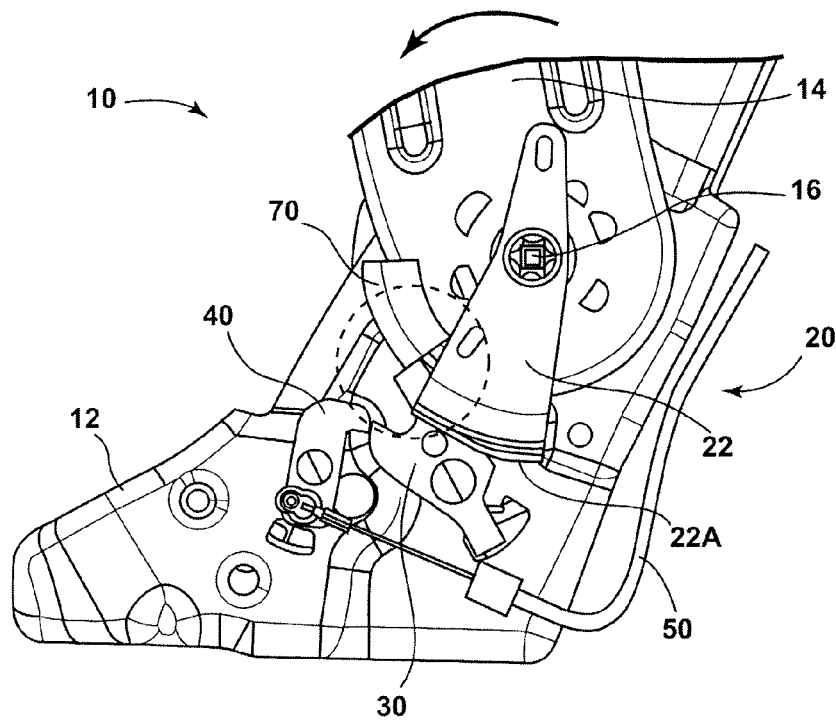
FIG. 7 is a side view of the backrest stopper mechanism of FIG. 4, generally shown in the actuated position.
Figure 8:
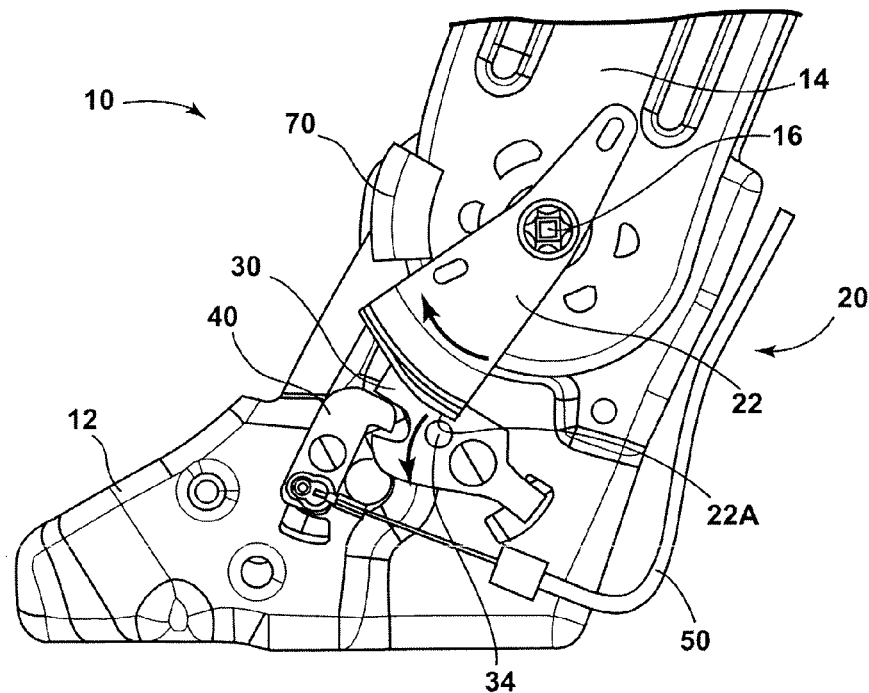
FIG. 8 is a side view of the backrest stopper mechanism of FIG. 4, generally shown in transition from the actuated position back to the non-actuated position.

As generally shown in FIG. 4, the backrest stopper mechanism 20 may include an easy entry stopper 30. The easy entry stopper 30 may be mounted on or connected to a portion of the seat frame that remains generally stationary relative to the backrest 14. The easy entry stopper 30 itself may be connected to or mounted on a seat frame for movement between a non-actuated position (e.g., as generally shown in FIGS. 4, 5 and 8) and an actuated position (e.g., as generally shown in FIGS. 6 and 7).

In a non-limiting embodiment, the easy entry stopper 30 can be mounted or connected for pivotal movement on the seat frame by a pivot pin 32 or other suitable fastener or device. As will be generally disclosed below, when the easy entry stopper 30 is in the non-actuated position, the backrest 14 may be permitted to pivot to the fold flat position. However, when the easy entry stopper 30 is in the actuated position, the backrest 14 may be stopped in the easy entry position. It should be appreciated that the easy entry stopper 30 may be mounted on or connected to other portions of a seat frame, such as the backrest 14 itself, and may still be configured to accomplish various functions, including those functions described herein and below, along with other functions.

The easy entry stopper 30 may also include a reset pin 34, although such is not required. In a non-limiting embodiment, the reset pin 34 may extend laterally outwardly from a side surface of an easy entry stopper 30 and can be radially spaced from the pivot pin 32. As generally disclosed below, a reset pin 34 may be configured to, among other functions, facilitate movement of the easy entry stopper 30 from the actuated position back to the non-actuated position. The reset pin 34 is not limited to the illustrated embodiment, but may have various other suitable shapes and/or configurations associated with desired applications.

As generally shown in FIG. 4, the easy entry stopper 30 may have a latch engagement portion that may be provided near an end thereof, and may be spaced from the pivot pin 32. In an embodiment, for example and without limitation, the latch engagement portion may comprise a bifurcated end of an easy entry stopper 30 that can be configured to receive a latch member 40 and lock the easy entry stopper 30 in the non-actuated position. It should be appreciated, however, that the latch engagement portion of the easy entry stopper 30 is not limited to the embodiment generally disclosed herein, but may comprise other suitable shapes and/or configurations without departing from the scope of the present disclosure.

The easy entry stopper 30 may also include a tab 36 that can be configured to limit pivotal movement of the easy entry stopper 30 within a desired range of motion (e.g., between the non-actuated and actuated positions), although such is not required. As generally shown, the tab 36 may laterally extend from an end of the easy entry stopper 30, and can be received within a generally elongated slot provided in a seat frame. In a non-limiting embodiment, the tab 36 may be integrally formed as part of the easy entry stopper 30 or, alternatively, may be a separate component secured thereto.

A biasing mechanism 38 may be provided between the easy entry stopper 30 and the seat frame to pivotally bias the easy entry stopper 30 in the actuated position. For example and without limitation, the biasing mechanism 38 may comprise a torsional spring or the like, and can be supported on the pivot pin 32 for engagement with the easy entry stopper 30.

As generally shown in FIG. 4, the backrest stopper mechanism 20 may also include a movable latch member 40. The latch member 40 may be connected to or mounted on a portion of a seat frame near the easy entry stopper 30. In a non-limiting embodiment, latch member 40 may be mounted on or connected to a seat frame for movement between a first or locked position (e.g., as generally shown in FIG. 5) and a second or unlocked position (e.g., as generally shown in FIG. 6).

For example and without limitation, the latch member 40 can be connected or mounted for pivotal movement on a seat frame by a pivot pin 42 or other suitable fastener or device. It should be appreciated that the latch member 40 may be mounted on or connected to other portions of a seat frame, such as the backrest 14 itself, and still be configured to accomplish the functions described herein and below, among other functions.

The latch member 40 may also include a connector pin 44, although such is not required. In a non-limiting embodiment, the connector pin 44 may laterally extend outwardly from a side surface thereof and can be radially spaced from the pivot pin 42. As will be generally disclosed below, the connector pin 44 may be configured to, among other functions, facilitate attachment of an actuating mechanism 50 to the latch member 40 for movement thereof between the locked and unlocked positions. The connector pin 44 is not limited to the illustrated embodiment but may have other suitable shapes or configurations to accomplish the functions described herein and below, along with other functions.

As generally shown in FIG. 4, the latch member 40 may have a latching portion that may be provided near an end thereof and can be spaced from the pivot pin 44. In a non-limiting embodiment, the latching portion may be configured to engage the latch engagement portion of the easy entry stopper 30 to lock the easy entry stopper 30 in the non-actuated position. For example and without limitation, the latch member 40 may generally define a hook-shaped end portion that can be configured to engage the easy entry stopper 30 to prevent pivotal movement of the easy entry stopper 30, such as described below. It should be appreciated that the latching portion of the latch member 40 is not limited to the embodiment disclosed herein, but may comprise various other suitable shapes and/or configurations without departing from the scope of the present disclosure.

The latch member 40 may also include a tab 46 that can be configured to limit pivotal movement of the latch member 40 within a desired range of motion (e.g., between the locked and unlocked positions), although such is not required. As generally illustrated, the tab 46 may laterally extend from an end of the latch member 40 and can be received within a generally elongated slot provided in a seat frame. In a non-limiting embodiment, the tab 46 may be integrally formed as part of the latch member 40 or, alternatively, may be a separate component secured thereto.

A biasing mechanism may be provided between the latch member 40 and the seat frame to pivotally bias the latch member 40 in the locked position. For example and without limitation, the biasing mechanism may comprise a torsional spring or the like, and can be supported on the pivot pin 42 for engagement with the latch member 40.

The backrest stopper mechanism 20 may also include an actuating mechanism 50. The actuating mechanism 50 can be configured to facilitate movement of the latch member 40—for example, from a locked position to an unlocked position. In a non-limiting embodiment, the actuating mechanism 50 may comprise a generally flexible cable assembly, such as a Bowden cable or the like, that is capable of transmitting a linear force. However, with other embodiments, the actuating mechanism 50 may comprise various other types of mechanical or electrical actuating mechanisms without departing from the scope of the present disclosure.

As generally shown in FIGS. 1 through 3, the easy entry seat assembly 10 may also include an easy entry actuator such as easy entry lever 60. In a non-limiting embodiment, for example, the easy entry lever 60 may be located near an upper portion of the backrest 14 for relatively easy access by a passenger. In other embodiments, however, the easy entry lever 60 can be provided at other suitable locations on an easy entry seat assembly.

As generally shown in FIG. 4, a first end of the actuating mechanism 50 may be attached to the connector pin 44 of the latch member 40, and a second end of the actuating mechanism 50 may be attached to the easy entry lever 60 for actuation of the backrest stopper mechanism 20. In a non-limiting embodiment, the backrest stopper mechanism 20 may also include a second actuating mechanism (e.g., a Bowden cable) that can be linked between the easy entry lever 60 and the reclining mechanism 16 for actuating the reclining mechanism 16 when the easy entry lever 60 is operated, such as generally disclosed below.

The backrest stopper mechanism 20 may also include a backrest stopper 70. The backrest stopper 70 can be configured to contact the easy entry stopper 30 when the easy entry stopper 30 is in the actuated position and when the backrest 14 is pivoted to the easy entry position. For example and without limitation, the backrest stopper 70 may be a structural feature or member provided on a portion of the backrest 14 for movement in connection with the backrest 14 relative to the easy entry stopper 30. In a non-limiting embodiment, the backrest stopper 70 may be a separate component rigidly secured to the backrest 14. In another embodiment, the backrest stopper 70 may be a structural feature that is integrally formed as part of the backrest 14. Moreover, the backrest stopper 70 may have various suitable shapes and/or sizes to, for example, perform various functions, including those described herein.

An operation of the backrest stopper mechanism 20 according to an embodiment of the present disclosure will now be generally described with reference to FIGS. 5 through 8. Referring to FIG. 5, the backrest stopper mechanism 20 is generally shown in the non-actuated position. In this position, the latch member 40 is biased in the locked position for engagement with the easy entry stopper 30. As such, the easy entry stopper 30 can be locked or otherwise held in the non-actuated position against the pivotal force of the respective biasing mechanism 38.

Referring now to FIG. 6, the backrest stopper mechanism 20 is generally shown in an actuated position. To operate the backrest stopper mechanism 20 from the non-actuated position to the actuated position, as generally shown the easy entry lever 60 on the backrest 14 can be operated, for instance, by a passenger. In doing so, the easy entry lever 60 may transmit a force (e.g., along the actuating mechanism 50) to pivot the latch member 40 from a locked position to an unlocked position. The latch member 40 may then disengage from the easy entry stopper 30 and the easy entry stopper 30 may automatically pivot from a non-actuated position to an actuated position—e.g., as a result of the respective biasing mechanism 38.

Referring now to FIG. 7, the easy entry lever 60 may also be configured to simultaneously release the reclining mechanism 16 to allow the backrest 14 to pivot in a forward direction. For example and without limitation, the backrest stopper mechanism 20 may include a second actuating mechanism (e.g., a Bowden cable) that can be linked between the easy entry lever 60 and the reclining mechanism 16 for actuating the reclining mechanism 16 when the easy entry lever 60 is operated. As such, the backrest 14 may be caused to pivot in the forward direction until the backrest stopper 70 (e.g., which may be provided on the backrest 14) contacts the easy entry stopper 30, which is highlighted by the broken circle in FIG. 7. As a result of the contact between the backrest stopper 70 and the easy entry stopper 30, the backrest stopper mechanism 20 may prevent further pivotal movement of the backrest 14 beyond the easy entry position. As such, the backrest 14 may be held in the easy entry position.

Referring now to FIG. 8, the backrest stopper mechanism 20 may be configured to be reset from an actuated position back to a non-actuated position by operation of recliner lever 22. For example and without limitation, pivotal movement of the recliner lever 22 may bring the cam surface 22A into contact with the reset pin 34 of the easy entry stopper 30, thereby pivoting the easy entry stopper 30 back to the non-actuated position. In doing so, the easy entry stopper 30 may engage the latch member 40 and briefly pivot the latch member 40 towards the unlocked position. After the latch portion of the easy entry stopper 30 clears the latching portion of the latch member 40, the latch member 40 may automatically pivot back to the locked position, thereby automatically locking the easy entry stopper 30 in the non-actuated position. As a result, the backrest 14 may then be pivoted to the fold flat position or back to the original upright seated position by operation of the reclining mechanism 16. Once the backrest stopper mechanism 20 is in the non-actuated position, further actuation of the recliner lever 22 will not unlock the easy entry stopper 30. In embodiments, the backrest stopper mechanism 30 can be actuated by operation of the easy entry lever 60 and can be deactivated by operation of the recliner lever 22.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. An easy entry seat assembly comprising:
   a seat frame having a seat bottom and a backrest, the backrest configured for pivotal movement relative to the seat bottom;
   a reclining mechanism provided on the seat frame to selectively control pivotal movement of the backrest relative to the seat bottom;

a backrest stopper mechanism provided on the seat frame, the backrest stopper mechanism including an easy entry stopper that is movable from a non-actuated position to an actuated position to stop pivotal movement of the backrest in an easy entry position; and an easy entry actuator provided on the seat frame, wherein operation of the easy entry actuator causes movement of the easy entry stopper to the actuated position and releases the reclining mechanism wherein the reclining mechanism includes a recliner lever, and operation of the recliner lever is configured to move the easy entry stopper from the actuated position to the non-actuated position.

2. The easy entry seat assembly of claim 1, wherein the easy entry stopper is mounted on or connected to the seat frame by a pivot pin for pivotal movement.

3. The easy entry seat assembly of claim 1, wherein the easy entry stopper is mounted on or connected to a portion of the seat frame that remains generally stationary relative to pivotal movement of the backrest.

4. The easy entry seat assembly of claim 1, wherein the easy entry stopper is biased in the actuated position by a biasing mechanism.

5. The easy entry seat assembly of claim 1, wherein the easy entry stopper includes a tab that is received within a slot formed in the seat frame to limit a range of motion of the easy entry stopper.

6. The easy entry seat assembly of claim 1, wherein a portion of the backrest is configured to contact the easy entry stopper when the easy entry stopper is in the actuated position.

7. The easy entry seat assembly of claim 6, wherein the backrest includes a backrest stopper mechanism that is configured to contact the easy entry stopper when the easy entry stopper is in the actuated position.

8. The easy entry seat assembly of claim 1, wherein the backrest stopper mechanism further includes a latch member that is movable between a locked position to lock the easy entry stopper in the non-actuated position and an unlocked position to release the easy entry stopper to the actuated position.

9. The easy entry seat assembly of claim 8, wherein the reclining lever includes a handle to facilitate pivotal movement of the reclining lever.

10. The easy entry seat assembly of claim 8, wherein the latch member includes a latching portion that is configured to engage the easy entry stopper and lock the easy entry stopper in the non-actuated position.

11. The easy entry seat assembly of claim 1, further including an actuating mechanism that is connected between the easy entry actuator and a latch member.

12. The easy entry seat assembly of claim 11, wherein operation of the easy entry actuator moves the latch member from a locked position to an unlocked position, thereby releasing the easy entry stopper to the actuated position.

13. The easy entry seat assembly of claim 12, wherein operation of the easy entry actuator simultaneously releases the reclining mechanism to permit pivotal movement of the backrest.

14. An easy entry seat assembly comprising:
a seat frame having a seat bottom and a backrest supported for pivotal movement relative to the seat bottom;
a reclining mechanism provided on the seat frame to selectively control pivotal movement of the backrest relative to the seat bottom; and
a backrest stopper mechanism provided on the seat frame, wherein the backrest stopper mechanism includes:
an easy entry stopper provided on a portion of the seat frame that remains generally stationary relative to the backrest, wherein the easy entry stopper is movable from a non-actuated position to an actuated position for contact with the backrest to stop pivotal movement of the backrest in an easy entry position when the reclining mechanism has been released;
a latch member provided on the seat frame, wherein the latch member is movable about a single axis relative to the seat frame between a locked position to lock the easy entry stopper in the non-actuated position and an unlocked position to release the easy entry stopper to the actuated position; and
an easy entry actuator provided on the seat frame, wherein operation of the easy entry actuator causes movement of the latch member from the locked position to the unlocked position and also releases the reclining mechanism.

15. The easy entry seat assembly of claim 14, wherein the backrest includes a backrest stopper that is configured to contact the easy entry stopper when the easy entry stopper is in the actuated position.

16. The easy entry seat assembly of claim 14, wherein an actuating mechanism is connected between the easy entry actuator and the latch member, and the latch member includes a connector configured to facilitate attachment of the actuating mechanism.

17. The easy entry seat assembly of claim 14, wherein the latch member includes a hook-shaped portion configured to selectively engage the easy entry stopper.

18. The easy entry seat assembly of claim 14, wherein the reclining mechanism includes a recliner lever, and operation of the recliner lever is configured to move the easy entry stopper from the actuated position to the non-actuated position.

19. The easy entry seat assembly of claim 18, wherein the recliner lever includes a ramped cam surface that, upon rotation of the recliner lever, is configured to contact and move the easy entry stopper from the actuated position to the non-actuated position.

20. The easy entry seat assembly of claim 19, wherein the easy entry stopper includes a reset pin, and the ramped cam surface is configured to contact the reset pin for movement of the easy entry stopper.

* * * * *